(12) United States Patent
Moritz et al.

(10) Patent No.: US 8,914,902 B2
(45) Date of Patent: Dec. 16, 2014

(54) METHOD FOR USER PRIVACY PROTECTION

(75) Inventors: Simon Moritz, Solna (SE); Yi Cheng, Sundbyberg (SE); Tor Kvernvik, Taby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 667 days.

(21) Appl. No.: 13/146,446

(22) PCT Filed: Jan. 28, 2009

(86) PCT No.: PCT/SE2009/050087
§ 371 (c)(1),
(2), (4) Date: Jul. 27, 2011

(87) PCT Pub. No.: WO2010/087746
PCT Pub. Date: Aug. 5, 2010

(65) Prior Publication Data
US 2011/0283365 A1     Nov. 17, 2011

(51) Int. Cl.
*G06F 17/30*    (2006.01)
*H04L 29/06*    (2006.01)
*G06Q 30/02*    (2012.01)
*G06F 21/10*    (2013.01)
*G06F 21/62*    (2013.01)

(52) U.S. Cl.
CPC ............... *H04L 63/06* (2013.01); *H04L 63/10* (2013.01); *G06Q 30/02* (2013.01); *G06F 21/10* (2013.01); *H04L 2463/101* (2013.01); *G06F 21/6245* (2013.01)
USPC ........................................................ 726/28

(58) Field of Classification Search
None
See application file for complete search history.

(56) References Cited

U.S. PATENT DOCUMENTS

2002/0087337 A1    7/2002  Hensley
2004/0073803 A1*   4/2004  Keramane ..................... 713/186
2008/0010685 A1*   1/2008  Holtzman et al. .............. 726/27

FOREIGN PATENT DOCUMENTS

EP       0715246 A1     6/1996
WO    2009008815 A1     1/2009

OTHER PUBLICATIONS

Kenny, S., et al., "Applying digital rights management systems to privacy rights management", Computers & Security, Elsevier Science Publishers, Amsterdam, NL, vol. 21, No. 7, Nov. 1, 2002, pp. 648-664, XP004393385.
Supplementary European Search Report issued on Mar. 25, 2013 in EP Application No. EP 09 839 363, 10 pages.
Office Action issued on Jun. 14, 2013 in corresponding Japanese application No. 2011-547854, 3 pages.

* cited by examiner

*Primary Examiner* — Brandon Hoffman
(74) *Attorney, Agent, or Firm* — Rothwell, Figg, Ernst & Manbeck P.C.

(57) ABSTRACT

A system for generation of processed data for use in third party relationship monitoring is described. The system includes a communications system providing services to subscribing users. The communications system includes a rules database for storing rules, a data mining agent for mining and storing data relating to subscribing users, a content generator for generating protected user-related data from the mined data and communicating said user-related data over an interface, and a rights object generator for generating a usage rights object in response to the rules stored in the rules database and communicating said usage rights object over the interface. A tamper proof processing arrangement is connected to the interface. The tamper proof processing arrangement receives the user-related data and usage rights object from the communications system and processes the user-related data under control of the usage rights object. A signal output generator generates an output signal representative of processed data received from the processing arrangement.

28 Claims, 6 Drawing Sheets

METHOD FOR USER PRIVACY PROTECTION

CROSS-REFERENCE TO RELATED APPLICATION

This application is a 35 U.S.C. §371 National Phase Entry Application from PCT/SE2009/050087, filed Jan. 28, 2009, and designating the United States.

FIELD OF THE INVENTION

The invention relates to the control of use of data, for example compiled at least partly from personal data. In particular, the invention relates to the export of data, compiled by a first party, to a second party, such that the first party can trust that the second party does not use the data improperly.

BACKGROUND

Telecom operators providing network services have access to large quantities of data about subscribing users. For example, an operator can collect data about user behaviour, services used, charging records, web-pages visited, other subscribers called, etc. Furthermore, collected data can be analysed to reach conclusions, for example about user preferences. A subscriber would trust the operator not to forward such data to a third party.

However, the data referred to would be useful to a third party for business purposes such as, for example, creating a campaign or for commercial advertising. Normally, if transfer of such data for this type purpose is made at all, a business agreement is made between the operator and the party using the data. However, there is no technical means that guarantees that the using party does not use the received data improperly. For example, once the third party has the data in its possession there is no way for the operator to prevent the data being passed on to other (fourth) parties.

In some circumstances it is not enough that an operator signs an agreement with a third party. If the third party does not fulfil their part of the agreement, there is no easy way for the operator to prevent them from doing so except by giving them fines etc., even though the third party behaviour may directly affect the goodwill of the operator. There is therefore a need for the operator to ensure that the third party cannot forward the information and knowledge that they got from the operator to a fourth party.

One approach to protecting private data involves so called "Lock-Box" technology, as defined, for example, in WO 2006/068551 and EP 1611725. Lock Box is a communication system for end user control of personal data. More specifically, it provides mechanisms to control whether and how a requesting entity can get access to user data that is available at a data providing entity. The classical Lock Box system employs a central server (broker) which checks a privacy policy defined by the end user and, if allowed according to the policy, provides information necessary for the requesting entity to retrieve user data from the providing entity. However, a problem with Lock Box is that, once the requesting entity has obtained the user related data, there is no means to prevent it from further distribution.

One way for Lock Box to solve the problem would be to let the end user define a new privacy policy in the broker database for the requesting entity which now becomes another data providing entity. The drawback of this approach is that the user has to define a privacy policy for every possible user data receiver, which is a heavy burden for the end user even if it is mitigated by efficient policy handling in the broker (e.g. by using a generic/individual privacy tree and daemon node as described in WO 2006/068551.

Even if an operator limits export of user related data to that which does not obviously reveal private data, the exported data may still be correlated by the receiving party with data from other sources, enabling the derivation of private data such as, for example, the name of a user. This process is generally referred to as "inductive learning". An operator may therefore be reluctant to provide any subscriber-related information to a third party because of the danger that the third party may be able to deduce additional sensitive information.

Thus, there is a need for a method and arrangement for control of processing of data such that user privacy is protected.

SUMMARY

The invention comprises a system and arrangement for generation of processed data (e.g. in the form of a media file) which may be useful in commercial applications such as the creation of a commercial campaign. A characteristic feature of the invention is that user privacy is protected and, at least partly, under control of the user. In one example it is possible to prevent the derivation of user identities from a generated media file.

In accordance with one aspect of the present invention, the system comprises a network of subscribing users, e.g. a communications system operated by a network operator. The communications system includes a data mining agent for generation of a data file containing user-related data which may include, for example, user data, user behaviour, user location and/or information derived therefrom. The communications network may include a rules database at least partly accessible by subscribing users to effect formation of rules. Based on the rules, a usage rights object may be generated for control of access to and use of the data file.

The communications system can connect to an external processing arrangement so as to transfer the data file, preferably protected by a key, and the usage rights object thereto. The processing arrangement processes the user-related data in the data file, possibly together with data from other sources. The processing is under control of the usage rights object. The connection can also communicate control signals to the processing arrangement, for example to manage a request for continued processing that may have stopped due to control by the usage rights object.

The generated data file may be structured into a first and a second part whereby the control of processing is such that the first part is not processed to correlate with the data from other sources.

A protected, (i.e. encrypted) data file is decrypted at the processing arrangement. However, the processing arrangement is arranged not to provide any part of the original data file in clear text. Instead, the processing arrangement has an output interface for output of a signal representative of the processed data file. The output signal may be input to a media generator for generation of a media file. The media file may comprise printed material such as an advertisement, or electronic material that can be provided to an identified group of people.

The output signal may be returned from the processing arrangement to the communications system, and used by the communications system to provide a targeted service to subscribed users. This enables the processing arrangement to provide targeted services (e.g. advertisements, marketing campaigns) to users with particular attributes, without ever knowing the actual identity of these users.

In accordance with another aspect of the present invention there is provided a tamper proof processing arrangement for connection to a communications system. The tamper proof arrangement comprises a receiving agent for receiving user-related data and a usage rights object from the communications system. A data processor processes the user-related data under the control of the usage rights object so as to derive, from the user-related data, elements usable in further processes, and generates an output signal which identifies the elements and the further processes for which they may be used. The signal may then be output via an output interface. The data processor does not retain the user-related data once the output signal has been generated. This ensures that the processing arrangement is unable to forward the user-related data to further entities.

The user-related data may be encrypted using a content encryption key by a rights issuer agent of the communications system. The usage rights object may be generated from usage rules using the same content encryption key.

In order to ensure that changes in user preferences are taken into account, the processing arrangement may initiate one or more requests to the communications system for processing of the user-related data on the basis of user consent data held by the communications system.

As previously discussed, it may be that the processing arrangement receives additional data from other sources. In this case the user-related data and additional data is processed under the control of the usage rights object so as to identify the elements of the user-related data that can be used for further processes, without correlating the user-related data and additional data. The lack of correlation during processing inhibits the processing arrangement from identifying user identities where these are not provided. Even if the user identities are provided to the processing arrangement, the lack of correlation should ensure that these identities are not provided to a third party. In some circumstances it may be that the usage rights object designates some portions of the user-related data as available for correlation with the second data and other portions as not available for correlation. Where this is the case, correlation should be such that resulting output fulfils specified policy restrictions on the basis of user consent data that controls the processing. One example of such a restriction is that the output for further processing does not allow identification of a user.

In accordance with a further aspect of the present invention there is provided a tamper proof processing arrangement connected to a communications system. A receiving agent receives first and second input data from at least first and second data sources, the first data being compiled from the communications system and the second data source being external to the communications system. A data processor loads a control object and process the first and second data under the control of the control object such that the first and second data are not correlated. An output interface outputs an output signal representative of the processed data.

In accordance with another aspect of the present invention there is provided a method of controlling use of third party relationship data in a communications system providing services to subscribing users. Rules defining the use that can be made of user-related data are generated and stored. Data relating to subscribing users is mined and stored, and protected user-related data is generated from the mined data. The protected user-related data is communicated to a tamper-proof processing arrangement. A usage rights object is generated using the stored rules, and this is also communicated to the processing arrangement. At the processing arrangement, the user-related data is processed under control of the usage rights object and an output signal representative of the processed user-related data is generated.

DETAILED DESCRIPTION

Some preferred embodiments of the invention will now be described by way of example only and with reference to the accompanying drawings, in which.

The protection of user privacy can be envisaged as being similar to the problem of distributing commercial content such as music or movies, such that content providers are assured that the content is used according to established rules. One method for achieving this is generally referred to as DRM (Digital Rights Management) protection. Several standards for DRM exist, for example OMA DRM (http://www.openmobilealliance.org/Technical/release_program/drm_v2_1.aspx). DRM technologies enable the distribution and consumption of digital content in a controlled manner.

Figure 1:
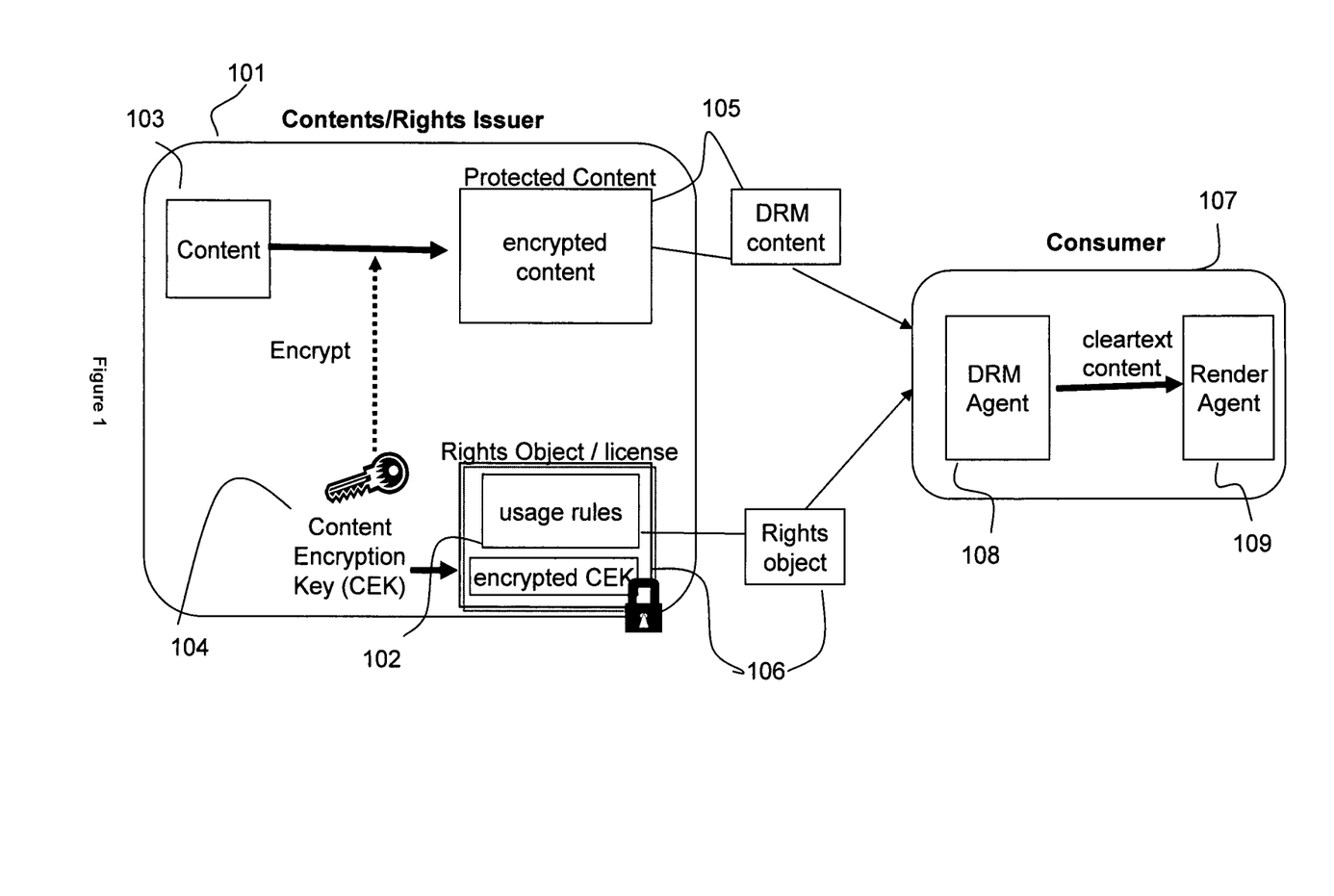
FIG. 1 illustrates a DRM system.

The basic principle of DRM is illustrated in FIG. 1. A contents/rights issuer 101 defines usage rules 102 for a particular content 103, e.g. for how long, or how many times, the content can be played. A content encryption key (CEK) 104 is created. The content 103 is encrypted with the content encryption key 104 to generate protected content 104. The CEK key 103 and the usage rules 102 are put into a license or Rights Object (RO) 106 which is signed by the rights issuer 101 to deter manipulation. The protected content 105 and the license 106 can be distributed together or separately to a consumer 107. At the consumer side, there are certified devices implementing a DRM Agent 108 and a Render Agent 109. Normally the RO 106 is protected with a key that can be obtained by the user on commercial conditions. The DRM Agent 108, having the key encrypting the RO 106, can retrieve the CEK 104 from the license 106, decrypt the content, and send the clear text content to the Render Agent 109. The Render Agent 109 renders the content, e.g. plays a music file or a movie file. A characteristic property of DRM systems is that the input content file is removed immediately after the rendering. If the consumer wants to play the content again, the DRM Agent will check whether that's allowed according to the usage rules specified in the license 106. If allowed the DRM Agent sends the clear text content to the Render Agent for another play. It is noted that the consumer device should be certified by some trust authority before it can consume DRM content. The hardware and software, including the implementation of DRM Agent 108 and Render Agent 109, must satisfy certain robustness rules, so that the device can not be easily hacked to reveal content encryption keys or clear text contents. It will be noted that a DRM system in the rendering phase provides the clear text of the input file. Therefore, if the file contains sensitive data there is no technical protection against forwarding the information to a third party although the input (digital) file is deleted.

Figure 2:
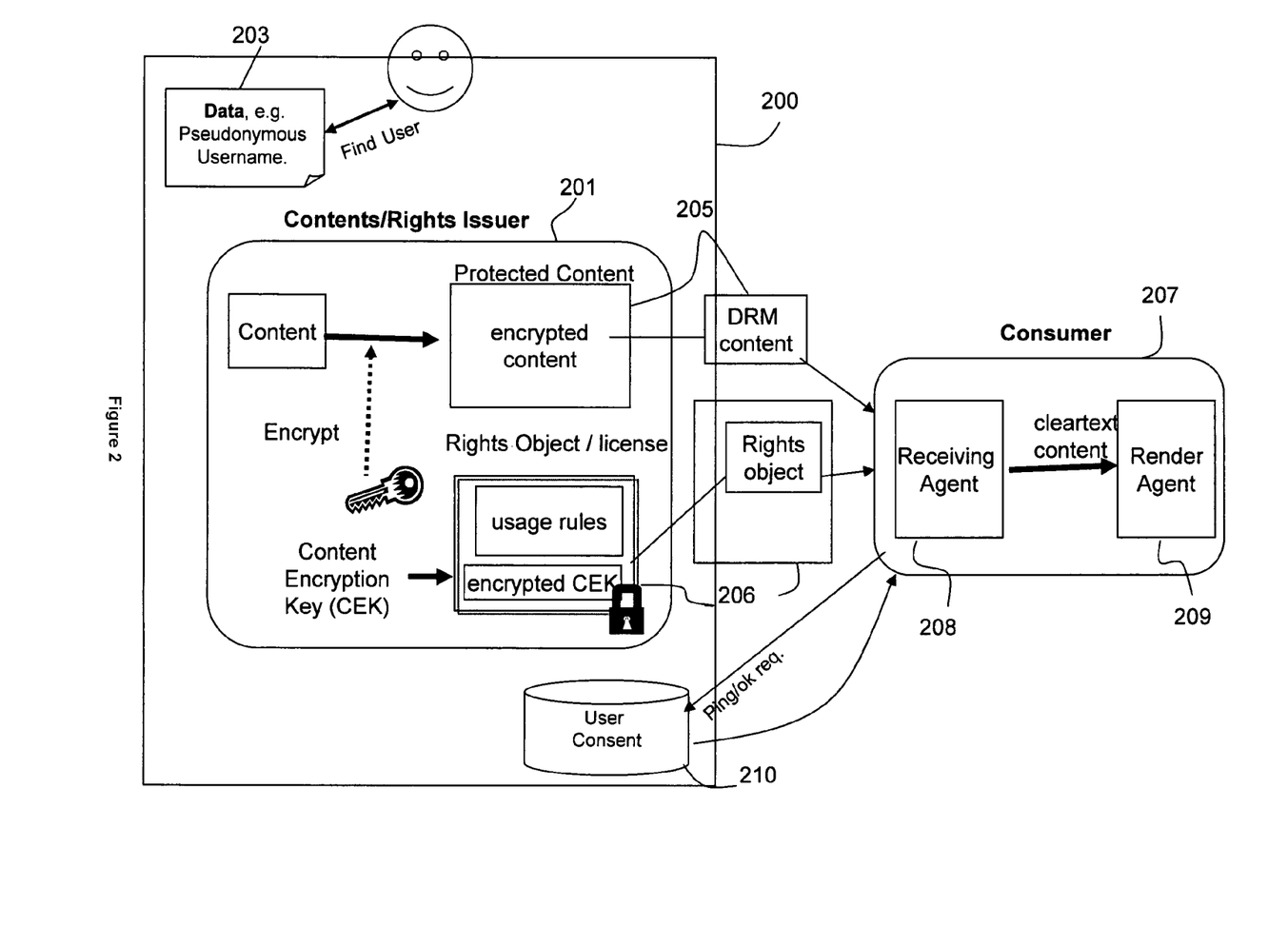
FIG. 2 illustrates an overview of a system for controlling third party rights management.

In order to provide such protection, an analogous situation can be created, as illustrated in FIG. 2. This is done by letting an operator 200 take the role of the contents/rights issuer 201, and a third party 207 take the consumer role. The operator 200 protects user-related data 203 (not necessarily user data itself) as "DRM content" 205 and specifies in a Rights Object 206 usage rules based on user privacy policy, as described in more detail below. The third party 207 has a certified Agent 208 to enforce those usage rules. Unlike the arrangement of a traditional DRM (where there is a Render Agent to play content) the third party 207 instead runs a data-processing application 209. This application 209 processes the (clear text) data provided by the operator 200, does analysis based on pre-defined criteria, and outputs a result (e.g. whether a promotion is appropriate, as described below). The data-processing application 209 also needs to be certified, i.e. the implementation is robust in that it only caches clear text data temporarily for processing purposes, and the data is removed immediately upon reaching a result. The certified data-processing application 209 is trusted to not reveal the operator-provided data outside the application. If the data-processing application would like to read the information again it first needs to "unlock" it by doing a simple "ping-request" like query to a data rule storage 210 located at the operator sphere. This storage 210 is where all rules (e.g. user consent, b2b agreements etc.) from the user and the operator are stored.

The risk that sensitive knowledge/information may be correlated with other information sources could also be protected by additional rules in the license 206. The operator 200 could specify a usage rule on those parts of the data that are not allowed to be used with information from other sources. This would restrict the possibilities for third parties to misuse the knowledge retrieved from a data mining application in the operator sphere. It would also hinder any attempt by the third party to forward it to a fourth party. This will help the operator to keep the control of "their" data and the privacy of the end user is maintained more easily.

Figure 3:
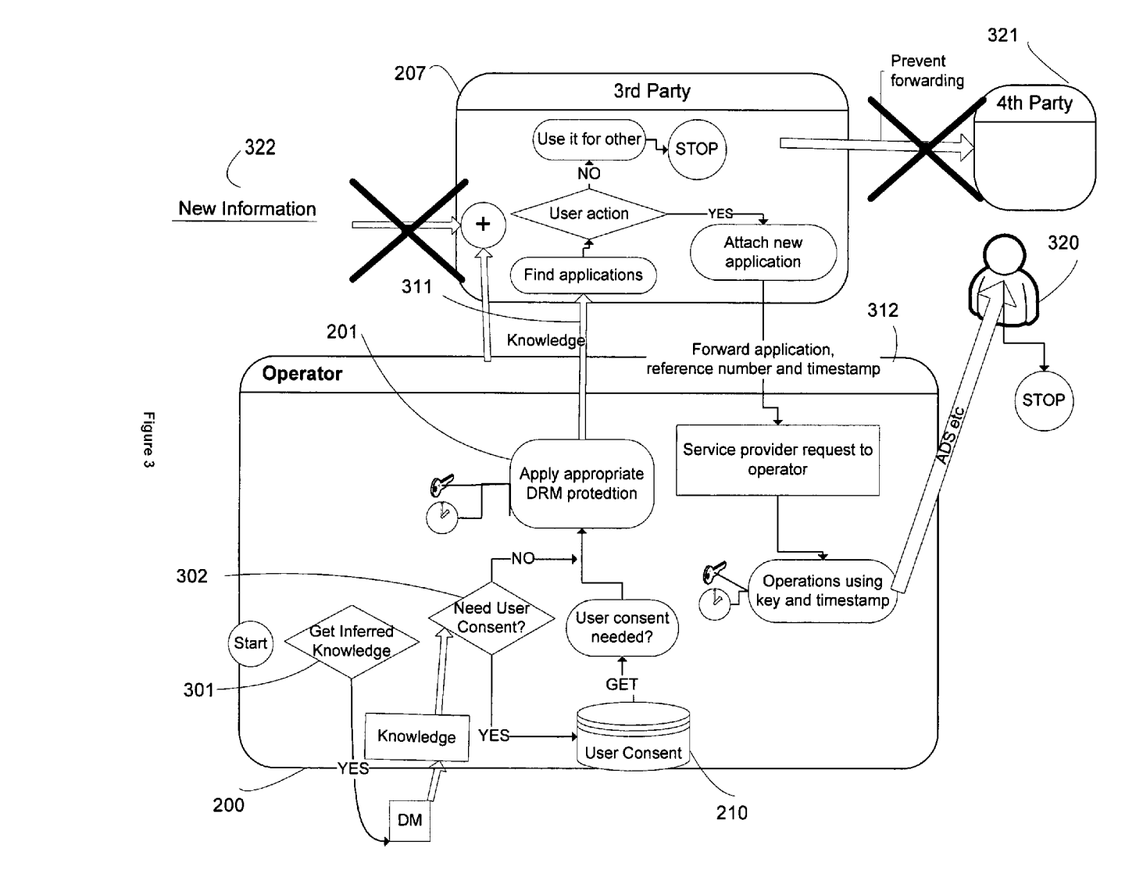
FIG. 3 illustrates the data flow between a user, operator, third party and fourth party.

FIG. 3 illustrates the data flow between a user 320, operator 200, third party 207 and fourth party 321. Initially the operator mines data 301 to gain inferred information about subscribed users. Before making any use of this information, it checks 302 whether user consent is required for information to be passed to a third party. If user consent is required, a reference is made to the user consent database 210 to see whether such consent is forthcoming.

The inferred information is passed to the content/rights issuer 201 to protect it as "DRM content". Part of this process includes "pseudonymization" so that the actual identity of users is never passed from the operator to any third party. Pseudonymization is a time depending service that encrypts the identity (e.g. MSISDN) of real end users (or groups of users) to a new random identification (alias) based on a timestamp and a key. In the simplest case it translates a number to a new number using an algorithm (hashing etc) that is dependent on the specific time.

When preparing the data to be sent to the third party, the operator can divide the data into several parts. For example, those attributes that are sensitive and may reveal user private information if correlated with information from other sources, are gathered in one part. Other attributes that can be used together with other information sources are gathered in another part. Then the operator can specify different usage rules for these different parts. Depending on the level of sensitivity, certain parts may be encrypted while the others left in clear text. This could be achieved for example by using OMA DRM multi-part DRM Content Format.

The operator 200 decides the rules on how the third party is allowed to use the information, e.g. which parts could be used with other information sources, which not, and for how long or how often the third party may use the information based on the B2B agreement and user consent. The content encryption key and the usage rules are then put in a license and protected by a key that is only known to the intended third party. The operator also digitally signs the license so that no one else can modify the license without being detected. Furthermore, to ensure the integrity of the provided information, the operator can calculate a hash value over the data and include the hash value into the license.

From the license, the third party can retrieve the content encryption key and use it to decrypt the information. The DRM Receiving Agent 208 of the third party 207 makes sure that the usage rules as specified in the license are followed. It could be the case that the user(s) has removed their consent or that the time limit for the consent has been reached, and the receiving agent then prevents the third party from using the information/knowledge.

In some cases an external party 207, e.g. an advertisement agency, is requesting to send information to a group of users in a network that is operated by another party e.g. a network operator 200. An example of this is a marketing campaign where it is required to limit the campaign to users that correspond to a certain profile or have some other criteria in common such as belonging to the same community. It is usually not required for the external party 207 to know the identity of the target users: it may be enough to know the size of the group and the profile of the users.

The method described above could be used to support this scenario. When the external party 207 wants to define a target group it adds some criteria in the request e.g. profile or location of the users, level of usage of certain telephony services, equipment type, etc. In response, the operator provides 311 details of a target group, including information such as the number of users, level of criteria fulfillment etc. The target group will also be tagged with a certain reference value that is encrypted as previously described below so that it can only be decrypted with a secret key and cannot be forwarded to fourth parties. It is also possible to limit the time the reference to the target group is valid or number of times that the referenced target group can be invoked.

In case of a marketing campaign this can be very useful since the external party 207 is usually not interested in the identities of the target users but rather the profile of the users and the size of the group. The network operators are also usually not willing to give the identities of the subscribers to external parties.

As a second step in the marketing campaign, when the external party 207 wants to launch the campaign, it may send 312 the reference value defining the target group to the network operator 200 together with the content of the campaign—for example the advertisements for distribution to the target group.

Figure 4:
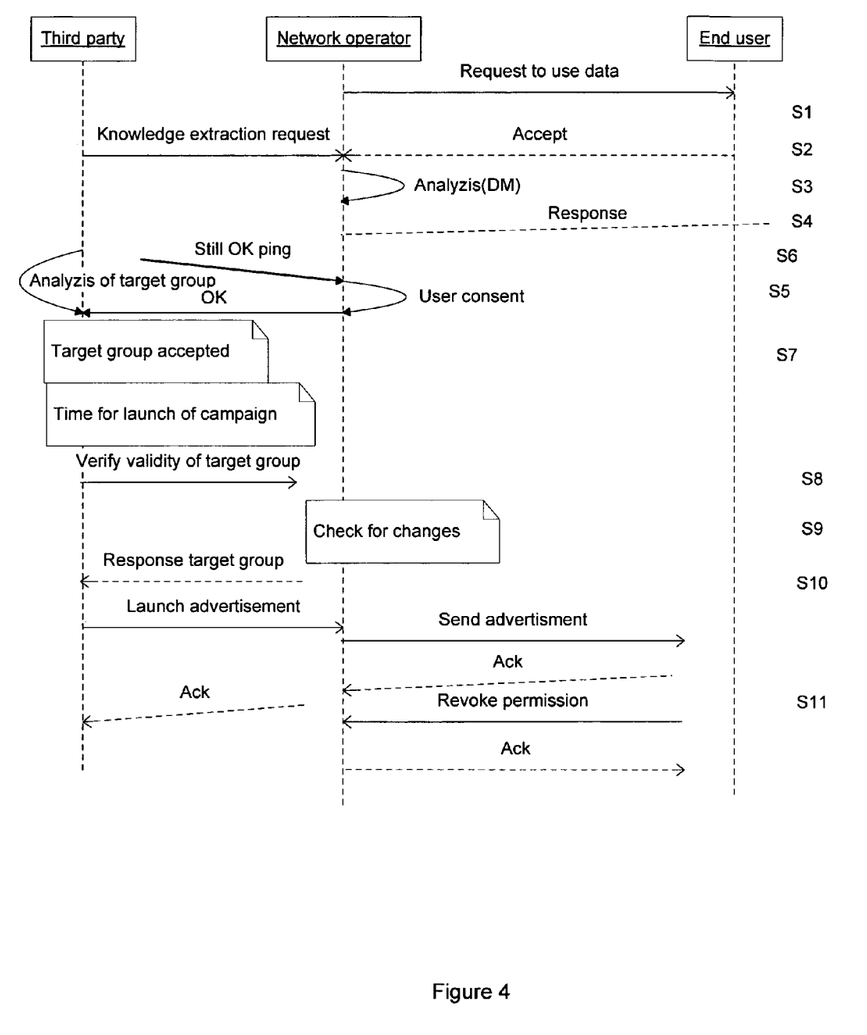
FIG. 4 is a sequence diagram illustrating the movement of data for identifying a target group for an advertisement and sending the advertisement to that target group.

An advertisement scenario can be understood with reference to FIG. 4. This can be broken down into steps as follows:

S1. First a user 320 gives her consent to a general or specific campaign. That information is stored locally by the operator 200 in a rule storage database 210. In addition to the user consent the operator may also add rules and regulations/criteria and store in the rule storage 210. It will be appreciated that only a single user 320 is illustrated in FIG. 4, but many users will need to give their consent to any campaign for the network to be able to extract meaningful information.

S2. A third party 207 makes a request to extract information about a group of users from the operator 200.

S3. The operator 200 performs additional analysis on the user-related data and subtracts unnecessary user information that reveals too much about the users (e.g. names, address, etc.), but still leaves enough information to make the response interesting for the third party 207. It will be appreciated that this analysis may be at the level of individual users or of groups of users.

S4. The operator 200 replies to the third party 207 and passes on a group of users that fulfils the requested criteria.

S5. The third party 207 receives the information using the application agent 208 and then starts to read it using the data processing agent 209.

S6. When reading the license the processing application 209 is requested to do a "ping like" check towards the rule storage 210, checking if the consent is still valid.

S7. The third party 207 eventually finds this targeted group interesting and decides to launch a campaign for them (If they do not find the targeted group interesting they may go back to step S2 and request other users).

S8. The third party 207 sends a request to the operator 200 that they want to launch a campaign with this group of users.

S9. The operator 200 checks if the rule storage has been changed and, if so, may filter out some of the users from the group.

S10. The operator sends a response to the third party 207 which then will launch the campaign. It will be noted that advertisements are sent it to users via the operator 200 and not directly, since the third party 207 does not have any access/address/phone number to the unique users.

S11. The users respond to the campaign or revoke it.

Figure 5:
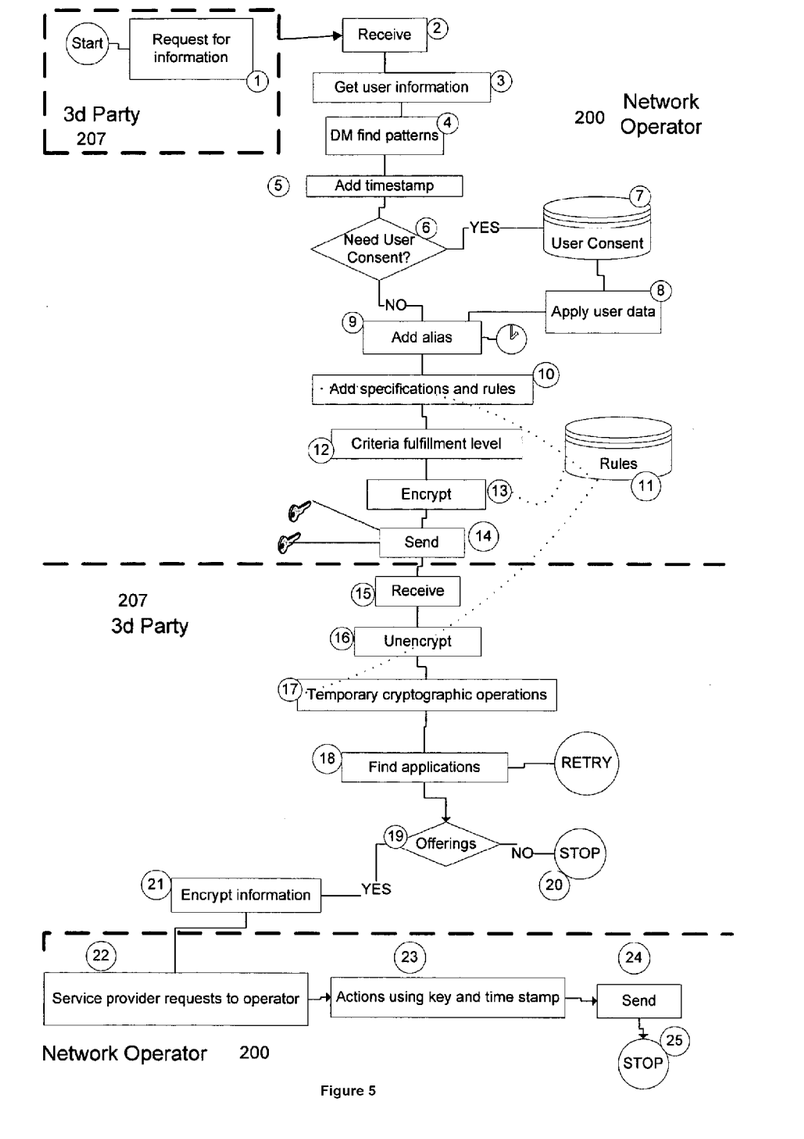
FIG. 5 illustrates detail of the process flow for the advertisement scenario of FIG. 4.

Detail of the process flow for the advertisement scenario of FIG. 4 is illustrated in FIG. 5.

1. The process starts when the third party 207 sends a request for user information, specifying certain criteria. The public key is also sent if it has not already been sent in the initial B2B agreement.
2. The network operator 200 receives the request and criteria.
3. The network operator 200 gets user information from the network
4. The network operator 200 enriches the data using a data mining process. From that, the network operator retrieves some kind of knowledge based on the data collected in step 3.
5. The network operator 200 adds a timestamp to the specific inferred data/knowledge
6. If the knowledge is in any way sensitive to the end user or group from whom it been selected, user consents may be required.
7. User consents may be given by either retrieving an answer from the referred user(s) directly (e.g. over the terminal) or indirectly when the user(s) signed the contract.
8. Users may also be given a choice to make specific requirement adjustments to the consents, such as whether it is possible to forward the information and for how long. All this information may be added to the consent.
9. Based on the timestamp given in step 5, the network operator 200 may create a time dependent random alias that refers to the targeted users or group of users. Since this is time dependent it will make it harder to track back to the original users for all others except the network operator itself.
10. The network operator 200 may also be given an option to adjust the data and level of security by looking into the specific user(s) requirements in step 8 and the B2B agreements that been signed with the specific third party that required the information in step 1.
11. The network operator may also create a time and/or amount restriction to the data that creates a need for the third party to continuously ask the network operator for permission to access the information. This is because the user(s) may change their consent(s) over time which must therefore impact the third party's access. It also provides the operator with more power and security over the possibly sensitive data/knowledge
12. The data in step 10 may be filtered out so that it fulfils the criteria stated in step 1 but still protects the identity of the user(s). That will impose yet another option just to filter out the information so that the network operator will forward only statistical, and not user specific, information.
13. The above data is encrypted with a secret key, and a hash value calculated on the encrypted data. The secret key, hash value, and time/amount restrictions if any, are put into a license.
14. It is then encrypted with the third party's public key and forwarded to the third party.
15. Third party 207 receives the information
16. Third party 207 decrypts the license with its private key, retrieves the secret key and uses it to decrypt the data.
17. Third party 207 requests additional permission from network operator (as defined in step 11). This works in a similar way to banking security programs stored locally on a user's pc. This prevents the third party from forwarding the knowledge to a fourth party.
18. Third party 207 is then free to find interesting patterns or application based on the knowledge. They could also adjust their criteria if the knowledge is not good or big enough. If so, start from step 1 again.
19. If the third party 207 wants to promote to the targeted user(s) with advertisements or similar they may, otherwise the process will stop.
20. Stop
21. In order to identify the user(s) and forward the advertisement, application or similar the third party 207 must send it back to the network operator 200, encrypted with the network operator public key
22. The network operator 200 will decrypt the request with its private key,
23. The network operator 200 identifies the real reference to the user by using the timestamp to find the random alias reference locally stored at the network operator.
24. The advertisement or application may then be forwarded to the user(s) without letting the third party 207 know exactly to whom they are promoting.
25. Stop The approach can be also be understood by reference to an example. Person Lisa is the only connection between Steven and Ms Smith. Lisa is 29 years old and likes to buy shoes. From her mobile phone usage her operator, A, has also learned that she likes listening to pop music while going to and from work (or at least the place where she usually spends time between 08.00 and 17.00). Now operator A would like to tell an advertiser company, B, (third party), a little about Lisa without risking Lisa's mistrust. First operator A asks Lisa if it is acceptable to use some of the network data knowledge to find new applications and added value to for her. Operator A proposes that if they may use her information, Lisa will not only get more relevant advertisements, but also a reduced mobile phone bill. Lisa agrees with this, but does not want operator A to reveal her identity to a third party.

Operator A has an B2B agreement with company B and knows that they would like to find targeted users for a new music campaign that they will promote. So operator A forwards an "information file" to company B that they have a person P in their network that likes to listen to pop music during the rush hour. The fact that person P listen to "pop" music is stated in clear text in the "information file", however there is also information that person P is connected to person P2 and person P3, but that information is said to be sensitive in this case and is kept hidden. Company B may therefore use the information that person P is a social person, but is not allowed to use that specific information together with other information. Lisa is the only connection between Steven and Ms Smith and if there were other information available from another source that Steven and Ms Smith are inside the specific social network, it would be clear that also Lisa is (inductive learning) and that was not allowed.

Company B uses the information and finds out that, since person P is a suitable user for their campaign, likes pop music and has a social network, they want to promote her with some new music that they believe P would like. Consequently they will send a new request to the operator A that person P should get this new music together with some advertisement. Operator A will then encrypt the reference to person P and then forward the music to Lisa who gets the new music, together with the advertisement that she can buy the whole CD from company B. She also gets a reduced bill.

If Lisa has a second thought while company B is studying the information file that they got from operator A, and decides that she no longer wants anyone to use her information, she can remove her consent. Company B would then no longer be able to use that file since they had to check periodically with a specific allowance repository at operator A that they can still use the application that they locally have that can read the "information file" from operator A. In other words, whenever Lisa wants to redraw her consent it is possible even if the information has already been shared with a third party.

Figure 6:
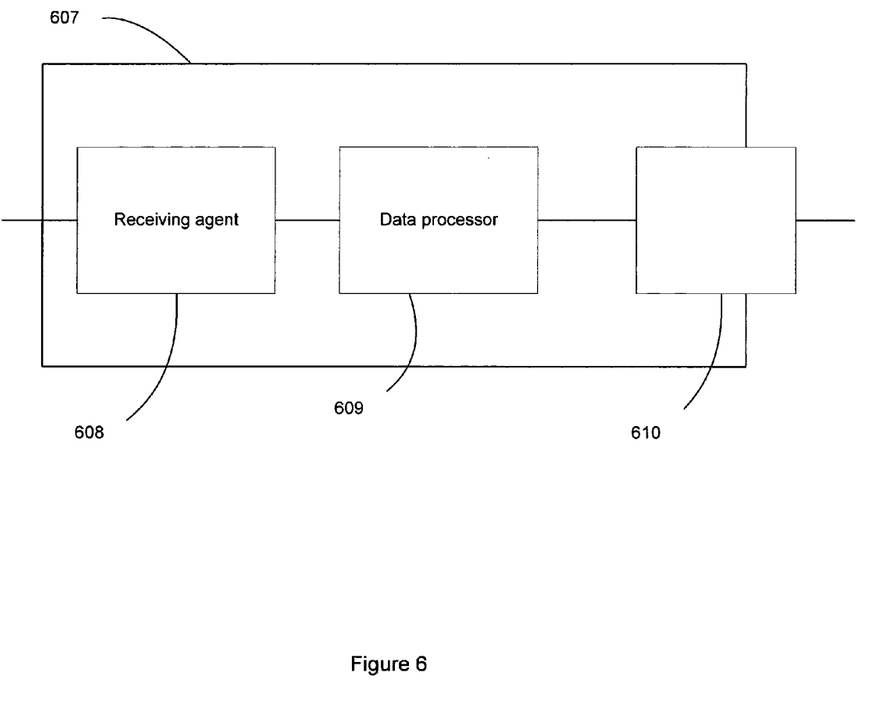
FIG. 6 is a schematic illustration of an exemplary tamper-proof processing arrangement.

FIG. 6 is a schematic illustration of an exemplary tamper-proof processing arrangement 607, of the type that would be used, for example, by the third part 207 shown in FIG. 2. The processing arrangement 607 includes a receiving agent 608 operatively connected to a data processor 609. The receiving agent 608 is arranged to receive user-related data and a usage rights object from a communications system such as the network 200 shown in FIG. 2. The data processor 609 is arranged to process the user-related data under the control of the usage rights object so as to identify elements of the user-related data usable in further processes and generate an output signal, the output signal identifying the elements of the user-related data and an identification of the further processes for which these elements may be used. The processing arrangement also contains an output interface 610 for output of the output signal.

It will be appreciated that variations from the above described embodiments may still fall within the scope of the invention, which is defined in the accompanying claims.

The invention claimed is:

1. A tamper proof processing arrangement for connection to a communications system, comprising:
   a receiving agent arranged to receive user-related data and a usage rights object from the communications system;
   a data processor arranged to process the user-related data under the control of the usage rights object so as to derive elements usable in further processes from the user-related data and generate an output signal, the output signal identifying the elements and an identification of the further processes for which these elements may be used; and
   an output interface for output of the output signal;
   wherein the data processor is arranged not to retain the user-related data after the output signal has been generated;
   wherein the user-related data is encrypted using a content encryption key by a rights issuer agent of the communications system, and wherein the usage rights object is generated from usage rules using the same content encryption key.

2. The tamper proof processing arrangement of claim 1, wherein the processing arrangement is unable to forward the user-related data to further entities.

3. The tamper proof processing arrangement of claim 1, arranged to initiate one or more requests to the communications system for processing of the user-related data on the basis of user consent data held by the communications system.

4. The tamper proof processing arrangement of claim 1, wherein:
   the receiving agent is arranged to receive additional data from a data source external to the communications system; and
   the data processor is arranged to process the user-related data and additional data under the control of the usage rights object so as to derive the elements of the user-related data that can be used for further processes, without correlating the user-related data and additional data.

5. The method of claim 1, wherein:
   the user-related data and the usage rights object are encrypted with the same content encryption key prior to the processing of the user-related data under the control of the usage rights object; and
   the processing the user-related data under the control of the usage rights object includes using the usage rights object to determine access to the user-related data.

6. The method of claim 5, wherein the usage rights object determines usage rules based on a user privacy policy.

7. A tamper proof processing arrangement connected to a communications system, comprising:
   a receiving agent arranged to receive first and second input data from at least first and second data sources, the first data source being compiled from the communications system and the second data source being external to the communications system;
   a data processor arranged to load a control object and process the first and second data under the control of the control object such that the first and second data are not correlated; and
   an output interface for output of an output signal representative of the processed data;
   wherein the first and second data not being correlated prevents private information within the first data from being determined by using the second data.

8. The arrangement of claim 7, further including a media generator arranged to generate a media file from the output signal.

9. The arrangement of claim 7, wherein the communications system is operated by a network operator and the first data includes user-related data including properties of at least some users subscribed to the network operator.

10. The arrangement of claim 9, wherein the control object is a usage rights object received from the communications system.

11. The arrangement of claim 10, wherein the usage rights object includes a portion controllable by the subscribed users.

12. The arrangement of claim 10, wherein the usage rights object designates some portions of the user-related data as available for correlation with the second data and other portions as not available for correlation.

13. The arrangement of claim 9, wherein the data processor, under the control of the control object, is arranged to initiate a request to the communications system for a consent indicator, and only carry out the data processing if the consent indicator enables this.

14. The arrangement of claim 7, arranged to forward the output signal, or a media file generated from the output signal, to the communications system so that information can be forwarded to users of the communications system.

15. A system for generation of processed data for use in third party relationship monitoring, comprising:
    a communications system providing services to subscribing users, the communications system including:
    a rules database for storing rules;
    a data mining agent for mining and storing data relating to subscribing users;
    a content generator for generating protected user-related data from the mined data and communicating said protected user-related data over an interface; and
    a rights object generator for generating a usage rights object in response to the rules stored in the rules database and communicating said usage rights object over the interface;
    a tamper proof processing arrangement, connected to the interface, for receiving the user-related data and usage rights object from the communications system and processing the user-related data under control of the usage rights object; and
    a signal output generator for generation of an output signal representative of processed data received from the processing arrangement.

16. The system of claim 15, wherein the rules database can be updated in response to requirements of subscribed users.

17. The system of claim 15, wherein the communications system further comprises a user consent database including details of consent for usage of the user-related data, and wherein the tamper-proof processing arrangement must obtain consent data from the database before processing the user-related data.

18. The system of claim 15, wherein the communications system is arranged to communicate control signals to the processing arrangement in response to requests for continued processing from the processing arrangement.

19. The system of claim 15, wherein the communications system includes means for receiving the output signal and providing a targeted service to the subscribed users as a result.

20. The system of claim 19, wherein the targeted service includes an advertisement or marketing campaign.

21. A method of controlling use of third party relationship data in a communications system providing services to subscribing users, comprising:
    generating and storing rules defining the use that can be made of user-related data;
    mining and storing data relating to subscribing users;
    generating protected user-related data from the mined data;
    communicating said user-related data to a tamper-proof processing arrangement;
    generating a usage rights object using the stored rules;
    communicating said usage rights object to the processing arrangement;
    at the processing arrangement, processing the user-related data under control of the usage rights object; and
    generating an output signal representative of the processed user-related data, the output signal including an identification of elements derived from the user-related data which can be used in further processes, together with an identification of the further processes for which these elements may be used.

22. The method of claim 21, wherein the output signal is used to generate a media file.

23. The method of claim 22, wherein the media file is returned to the communications system and used to direct targeted services to selected subscribed users.

24. The method of claim 21, wherein the user-related data received from the communications system is not retained by the processing arrangement after the output signal has been generated.

25. The method of claim 21, wherein the communications system maintains a user consent database containing user preferences, and wherein the processing arrangement contacts the user consent database to obtain permission before processing the user-related data.

26. The method of claim 25, wherein users update their preferences in the user consent database.

27. The method of claim 21, wherein the users are able to update the rules stored by the communications system.

28. The method of claim 21, wherein the processing arrangement obtains additional data from a data source external to the communications system, and processes the additional data with the user-related data under control of the usage rights object without correlating the additional data with the user-related data.

\* \* \* \* \*

UNITED STATES PATENT AND TRADEMARK OFFICE
CERTIFICATE OF CORRECTION

PATENT NO. : 8,914,902 B2  
APPLICATION NO. : 13/146446  
DATED : December 16, 2014  
INVENTOR(S) : Moritz et al.

Page 1 of 1

It is certified that error appears in the above-identified patent and that said Letters Patent is hereby corrected as shown below:

In the drawings

In Fig. 6, Sheet 6 of 6, delete " " and insert --  --, therefor.

In the specification

In Column 4, Line 38, delete "protected content 104." and insert -- protected content 105. --, therefor.

In Column 4, Line 39, delete "CEK key 103" and insert -- CEK key 104 --, therefor.

In the claims

In Column 10, Line 34, in Claim 5, delete "method of claim 1," and insert -- tamper proof processing arrangement of claim 1, --, therefor.

In Column 10, Line 43, in Claim 6, delete "method of claim 5," and insert -- tamper proof processing arrangement of claim 5, --, therefor.

Signed and Sealed this  
Fourteenth Day of June, 2016

Michelle K. Lee  
*Director of the United States Patent and Trademark Office*